(12) United States Patent
Hommura et al.

(10) Patent No.: US 7,910,236 B2
(45) Date of Patent: Mar. 22, 2011

(54) ELECTROLYTE MATERIAL, ELECTROLYTE MEMBRANE AND MEMBRANE-ELECTROLYTE ASSEMBLY FOR POLYMER ELECTROLYTE FUEL CELLS

(75) Inventors: Satoru Hommura, Yokohama (JP); Atsushi Watakabe, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 959 days.

(21) Appl. No.: 11/741,008

(22) Filed: Apr. 27, 2007

(65) Prior Publication Data

US 2007/0202377 A1 Aug. 30, 2007

Related U.S. Application Data

(63) Continuation of application No. PCT/JP2005/019729, filed on Oct. 26, 2005.

(30) Foreign Application Priority Data

Oct. 27, 2004 (JP) .................................. 2004-311833

(51) Int. Cl.
H01M 8/10 (2006.01)
(52) U.S. Cl. ............. 429/33; 429/314; 429/317; 521/25
(58) Field of Classification Search .................. 429/33, 429/314, 317; 521/25
See application file for complete search history.

(56) References Cited

U.S. PATENT DOCUMENTS

| | | | | |
|---|---|---|---|---|
| 3,282,875 | A * | 11/1966 | Connolly et al. | 524/795 |
| 5,817,718 | A | 10/1998 | Nezu et al. | |
| 6,586,626 | B2 * | 7/2003 | Okazoe et al. | 562/863 |
| 6,610,789 | B2 * | 8/2003 | Watakabe et al. | 525/276 |
| 7,220,508 | B2 * | 5/2007 | Watakabe et al. | 429/33 |
| 7,271,229 | B2 * | 9/2007 | Okazoe et al. | 526/247 |
| 7,429,428 | B2 * | 9/2008 | Watakabe | 429/33 |
| 2002/0064700 | A1 | 5/2002 | Higuchi et al. | |
| 2002/0142207 | A1 * | 10/2002 | Watakabe et al. | 429/33 |
| 2004/0230018 | A1 * | 11/2004 | Okazoe et al. | 526/242 |
| 2005/0266291 | A1 * | 12/2005 | Watakabe | 429/33 |
| 2006/0099476 | A1 | 5/2006 | Watakabe et al. | |

FOREIGN PATENT DOCUMENTS

| | | | |
|---|---|---|---|
| EP | 1 091 435 A1 | 4/2001 | |
| EP | 1220344 A2 * | 12/2001 | |
| JP | 5-213929 A * | 8/1993 | |
| JP | 5-261851 | 10/1993 | |
| JP | 09102322 A2 | 4/1997 | |
| JP | 11-329062 | 11/1999 | |
| JP | 2002-313364 | 10/2002 | |
| JP | 2002-348389 | 12/2002 | |
| JP | 2003-82129 | 3/2003 | |
| WO | WO 86/06879 | 11/1986 | |
| WO | WO-00/56694 | * | 9/2000 |
| WO | WO 03/037885 A1 | 5/2003 | |

OTHER PUBLICATIONS

Polymer Preprints, Japan, vol. 53, No. 2, 2004, pp. 4844-4863.
"Polymer Physics", East-North Technical University Publishing House, 1998, pp. 97-98 and 1 cover page.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

To provide an electrolyte material for polymer electrolyte fuel cells having a high softening temperature and being excellent in durability, and an electrolyte membrane and a process for producing a membrane-electrode assembly using it.

An electrolyte material made of a polymer containing a segment A of a polymer containing repeating units based on a perfluoromonomer having an ion exchange group and having a polymerizable double bond, at least one of carbon atoms in the polymerizable double bond being a carbon atom contained in an alicyclic structure, and a segment B of a fluoropolymer containing substantially no ion exchange group, and an electrolyte membrane and a membrane-electrode assembly using it.

8 Claims, No Drawings

ELECTROLYTE MATERIAL, ELECTROLYTE MEMBRANE AND MEMBRANE-ELECTROLYTE ASSEMBLY FOR POLYMER ELECTROLYTE FUEL CELLS

TECHNICAL FIELD

The present invention relates to an ion exchange group-containing polymer useful as an electrolyte to be used for an ion exchange membrane (such as a membrane for electrolysis of sodium chloride or polymer electrolyte fuel cells) or a catalyst layer for fuel cells, as an electrolyte for lithium cells, etc., and a polymer containing fluorosulfonyl groups used for production of such a polymer.

BACKGROUND ART

Heretofore, for membranes of electrolysis of sodium chloride, for membranes or catalyst layers for polymer electrolyte fuel cells, it has been common to employ a polymer which is obtainable by hydrolyzing a copolymer of a fluoromonomer represented by $CF_2=CF-(OCF_2CFY)_m-O_p-(CF_2)_n-SO_2F$ (wherein Y is a fluorine atom or a trifluoromethyl group, n is an integer of from 1 to 12, m is an integer of from 0 to 3, and p is 0 or 1, provided that m+p>0) with tetrafluoroethylene, or a polymer having sulfonic acid groups obtainable by further converting the above polymer to an acid form (hereinafter a polymer having sulfonic acid groups will be referred to as a sulfonic acid polymer).

Such a sulfonic acid polymer has a softening temperature in the vicinity of 80° C. Accordingly, the operation temperature of a fuel cell employing such a polymer is usually at most 80° C. However, in a case where hydrogen obtainable by reforming an organic compound composed of carbon atoms and hydrogen atoms such as methanol natural gas or gasoline, or hydrogen obtainable by reforming an organic compound composed of carbon atoms, hydrogen atoms and oxygen atoms, is used as a fuel gas for a fuel cell, if a carbon monoxide is contained even in a trace amount, the electrode catalyst will be poisoned, and the output of the fuel cell tends to be low. Accordingly, in order to prevent such a trouble, it is desired to increase the operation temperature. Further, also with a view to downsizing the cooling device for fuel cells, it is desired to increase the operation temperature. However, the above-mentioned conventional polymer has a low softening temperature and cannot satisfy such demands.

On the other hand, use of a sulfonic acid polymer having short side chains and having a high softening temperature as an electrolyte for a fuel cell has been proposed (Patent Document 1). However, such a sulfonic acid polymer is difficult to produce and is expensive. Further, it has been proposed to provide a polymer having a higher tensile modulus at 110° C. or above than that of Nafion film (tradename, manufactured by E.I. duPont) which is the above-described sulfonic acid polymer, using a material having at least two fluoropolymer chain segments differing in the composition, at least one of which has a sulfonic acid type functional group (Patent Document 2). However, the effect of increasing heat resistance is insufficient, since a vinyl ether type monomer is used as the segment having a sulfonic acid group.

Further, as a process for producing a graft copolymer disclosed in Patent Document 2, a method utilizing radioactive rays has been known. A method has been known which comprises irradiating a membrane-shape substrate of e.g. a polytetrafluoroethylene (PTFE), a tetrafluoroethylene/hexafluoropropylene copolymer (FEP) or a tetrafluoroethylene/perfluoro(alkyl vinyl ether) copolymer (PFA) with radioactive rays, and bringing the substrate into contact with styrene to form graft side chains to introduce sulfonic acid groups. However, various improvements have been made since no sufficient chemical durability was achieved. For example, a method of preventing break of the main chain during irradiation with radioactive rays by employing an ethylene-tetrafluoroethylene copolymer (PTFE) as the membrane-shape substrate (Patent Document 3) or a method wherein PTFE is used as the membrane-shape substrate, and it is irradiated with radioactive rays while heated at 340° C. to crosslink PTFE, and the substrate is used in such a state (Non-Patent Document 1) may, for example, be mentioned.

However, in either case, the graft side chains comprise polystyrene sulfonic acid, and deterioration from the side chains is inevitable. Accordingly, a method of grafting side chains containing an oxyhydrofluorocarbon ($-OCH_2CF_2CF_2SO_3H$) to the crosslinked PTFE has been proposed (Patent Document 4), but it is difficult to secure sufficient durability because of C—H bonds.

Patent Document 1: Japanese Patent No. 2675548
Patent Document 2: JP-A-11-329062
Patent Document 3: JP-A-9-102322
Patent Document 4: JP-A-2002-348389
Non-Patent Document 1: Polymer Preprints, Japan Vol. 53, No. 2 (2004)

DISCLOSURE OF THE INVENTION

Object to be Accomplished by the Invention

Thus, it is an object of the present invention to provide a polymer electrolyte material excellent in durability and having a high softening temperature, which makes operation of a fuel cell at high temperature as compared with conventional one possible when used as an electrolyte material for polymer electrolyte fuel cells.

Means to Accomplish the Object

The present invention provides an electrolyte material made of a polymer containing a segment A of a polymer containing repeating units based on a perfluoromonomer having an ion exchange group and having a polymerizable double bond, at least one of carbon atoms in the polymerizable double bond being a carbon atom contained in an alicyclic structure, and a segment B of a fluoropolymer containing substantially no ion exchange group, and an electrolyte membrane made of the electrolyte material.

The present invention further provides a membrane-electrode assembly for polymer electrolyte fuel cells, which comprises a catalyst layer containing a catalyst and an ion-exchange resin disposed on each side of the above electrolyte membrane, and a gas diffusion layer disposed on each catalyst layer.

Still further, the present invention provides a process for producing an electrolyte membrane made of a graft copolymer, which comprises irradiating a membrane-shape substrate made of a fluoropolymer containing substantially no ion exchange group with radioactive rays, and bringing the substrate into contact with a perfluoromonomer containing an ion exchange group or a precursor group thereof and a polymerizable double bond, to form graft side chains by the perfluoromonomer.

In the above process, an electrolyte membrane can be produced in a simple process, and production at a low cost is possible. Further, at the same time, it is possible to easily adjust properties such as an ion exchange capacity. In this production process, by use of, as the perfluoromonomer for forming side chains, a perfluoromonomer in which at least one of carbon atoms constituting the carbon-carbon double bond is a carbon atom contained in an alicyclic structure, the above-described electrolyte membrane wherein the segment B corresponds to the main chain of the graft copolymer and the segment A corresponds to the side chains, can be produced efficiently.

EFFECTS OF THE INVENTION

The electrolyte material of the present invention is excellent in chemical durability and has a high softening temperature, and a membrane-electrode assembly for polymer electrolyte fuel cells provided with an electrolyte membrane made of the electrolyte material is capable of operating at high temperature as compared with a conventional membrane-electrode assembly and is excellent in durability.

BEST MODE FOR CARRYING OUT THE INVENTION

The present inventors have conducted extensive studies to obtain a polymer having a high softening temperature, and as a result, found that a polymer is effective which has a phase-separated structure into a segment of a polymer based on a perfluoromonomer having an ion exchange group and a segment of a fluoropolymer having substantially no ion exchange group. That is, by separating the structure of a polymer into a segment which develops ion conduction and a segment which maintains the polymer skeleton by function, it is possible to increase the softening temperature while electrical conductivity is maintained as compared with a random copolymer. Further, the softening temperature can be further increased by introducing a cyclic structure to the segment which develops ion conduction.

The segments A and B in the present invention can form various forms of the phase-separated structure, and they may be formed, for example, by copolymerization. To form a more microphase-separated structure, a copolymer is preferred, and specifically, a block copolymer or a graft copolymer is preferred. The block copolymer may, for example, be a form of A-B, A-B-A or B-A-B, and the graft copolymer may, for example, be a form wherein the segment B is grafted to the main chain of the segment A, or a form wherein the segment A is grafted to the main chain of the segment B. Particularly, a graft copolymer comprising side chains of the segment A and the main chain of the segment B is preferred. By employing the segment B containing no ion exchange group as the main chain skeleton, the strength will be further increased, and at the same time, a high effect of inhibiting swelling when the polymer contains water is achieved.

The ion exchange group contained in the polymer constituting the segment A is not particularly limited so long as it is a functional group which develops proton conductivity. It may, for example, be a sulfonic acid group, a sulfonimide group, a phosphonic acid group or a carboxylic acid group, or a metal salt thereof, or an ammonium salt, and it is preferably a group represented by $-(SO_2X(SO_2R^f)_a)^-M^+$ (wherein $M^+$ is $H^+$, a monovalent metal cation or an ammonium ion containing or not containing a hydrocarbon substituent, $R^f$ is a linear or branched perfluoroalkyl group which may contain an etheric oxygen atom, "a" is an integer of from 0 to 2, and X is an oxygen atom, a nitrogen atom or a carbon atom, provided that a=0 when X is an oxygen atom, a=1 when X is a nitrogen atom, and a=2 when X is a carbon atom). Specifically, preferred is a $-SO_3^-M^+$ group such as a sulfonic acid group, a sulfonimide group ($-SO_2N^-M^+SO_2R^f$) or a sulfone methide group ($-SO_2C^-M^+(SO_2R^f)_2$). $R^f$ preferably has from 1 to 8 carbon atoms, particularly preferably from 1 to 6 carbon atoms, and is particularly preferably a perfluoromethyl group, a perfluoroethyl group or the like which has high proton conductivity. Further, in the case of a sulfone methide group, two $R^f$'s may be the same or different.

The perfluoromonomer to be polymerized to obtain the polymer constituting the segment A (which may be homopolymerized or copolymerized with another monomer) is a monomer in which at least one of carbon atoms constituting the polymerizable double bond is contained in an alicyclic structure, and which has an ion exchange group or a precursor group thereof (hereinafter such a monomer will be referred to as the present alicyclic monomer). Specifically, a monomer having a structure of the following formula (A) or (B) is suitable. A monomer having a structure of the following formula (B) is more preferred considering easiness of preparation of the monomer.

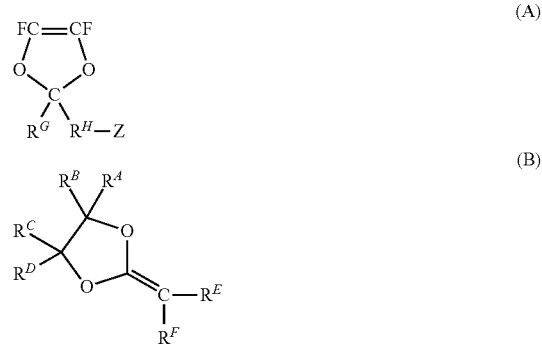

In the formula (A), Z is an ion exchange group or a precursor group thereof, $R^G$ is a fluorine atom or a perfluoroalkyl group, and $R^H$ is a perfluoroalkenyl group which may contain an etheric oxygen atom. In the formula (B), each of $R^A$ to $R^D$ which are independent of one another, is selected from the group consisting of a fluorine atom and a monovalent perfluoroorganic group which may contain at least one of an ion exchange group or a precursor group thereof and an etheric oxygen atom, but two among $R^A$ to $R^D$ may be mutually bonded to form a bivalent perfluoroorganic group which may contain at least one of an ion exchange group or a precursor group thereof and an etheric oxygen atom. Here, at least one of $R^A$ to $R^D$ contains an ion exchange group or a precursor group thereof. Each of $R^E$ and $R^F$ which are independent of each other, is a monovalent perfluoroorganic group which may contain an etheric oxygen atom, or a fluorine atom.

In this specification, a precursor group of an ion exchange group is a group to be converted to an ion exchange group by known treatment such as hydrolysis or conversion to an acid form, and it may, for example, be a $-SO_2F$ group. Precursor groups are converted to ion exchange groups after polymerization thereby to obtain a polymer electrolyte material. Further, the above perfluoroorganic group is, specifically, preferably a monovalent perfluorocarbon group which may contain an etheric oxygen atom, particularly preferably a perfluoroalkyl group which may contain an etheric oxygen atom. Among the compounds represented by the formula (B) (hereinafter a compound represented by the formula (x) will be referred to as "compound (x)"), particularly preferred is a compound (C).

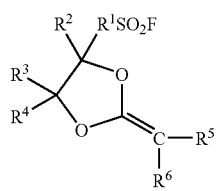

(C)

In the formula (C), $R^1$ is a bivalent perfluoroorganic group which may contain an etheric oxygen atom, and each of $R^2$ to $R^6$ which are independent of one another, is a fluorine atom or a monovalent perfluoroorganic group which may contain an etheric oxygen atom. The organic group is a group containing at least one carbon atom, and the monovalent perfluoroorganic group is particularly preferably a linear or branched perfluoroalkyl group (which may contain an etheric oxygen atom in the interior or at one terminal of the alkyl chain).

In order that the compound (C) has high polymerizability, at least one of $R^5$ and $R^6$ is preferably a fluorine atom. It is more preferred that one of $R^5$ and $R^6$ is a fluorine atom and the other is a fluorine atom or a perfluoroalkoxy group, and it is furthermore preferred that the compound (C) has a structure of the following formula (C') wherein both $R^5$ and $R^6$ are fluorine atoms. $R^1$ to $R^4$ in the compound (C') are as defined above. Among compounds (C'), compound (D) is particularly preferred, which has high polymerizability and which is easily prepared. Compound (D) is prepared by several methods as disclosed in WO03/037885.

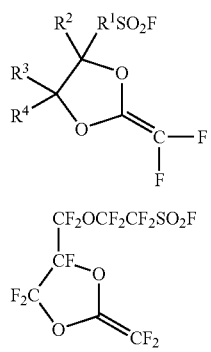

(C')

(D)

The segment A may comprise a homopolymer of the above-described present alicyclic monomer (in the case of a monomer having a precursor group, a polymer having precursor groups converted to ion exchange groups) or may comprise a copolymer of the perfluoromonomer with at least one polymerizable monomer (hereinafter referred to as a comonomer) (the same as the above in the case of a monomer having a precursor group). The perfluoromonomer represented by the formula (C), in which the precursor group if any is converted to an ion exchange group after polymerization, is present to constitute repeating units represented by the formula (1), in the segment A. As described above, particularly preferably $R^2$ to $R^6$ are fluorine atoms and $R^1$ is a perfluoroalkyl group which may contain an oxygen atom, and the ion exchange group is preferably $SO_3^-M^+$. Thus, among repeating units represented by the formula (1), particularly preferred are repeating units represented by the formula (2).

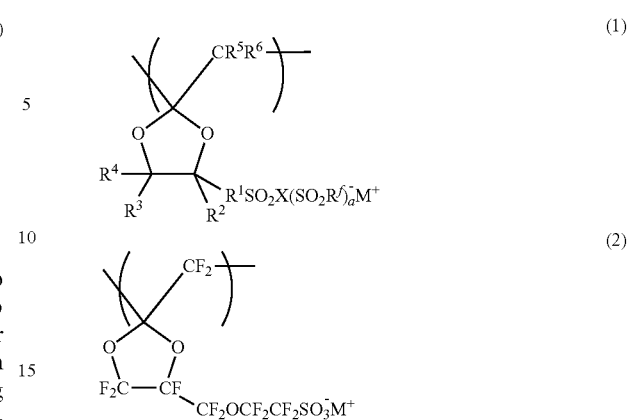

(1)

(2)

In a case where the segment A is a copolymer, as the comonomer to be copolymerized with the present alicyclic monomer, usually a monomer having no ion exchange group or a precursor group thereof is selected. Such a comonomer may, for example, be tetrafluoroethylene, chlorotrifluoroethylene, trifluoroethylene, vinylidene fluoride, vinyl fluoride, ethylene, perfluoro(3-butenyl vinyl ether), perfluoro(allyl vinyl ether), perfluoro(2,2-dimethyl-1,3-dioxole), perfluoro (1,3-dioxole), perfluoro(2-methylene-4-methyl-1,3-dioxolane), perfluoro(3,5-dioxa-1,6-heptadiene or perfluoro(4-methoxy-1,3-dioxole). Further, compounds (3) and (4) (in the formula, p is an integer of from 2 to 6) are also suitably used.

Particularly, tetrafluoroethylene is preferred, with which a copolymer not only excellent in chemical stability and heat resistance but also having high mechanical strength and having a softening temperature higher than that of a conventional sulfonic acid polymer, can be obtained. Further, use of a comonomer having a cyclic structure or a cyclopolymerizable comonomer is preferred, whereby a cyclic structure can be introduced into the segment A in a large amount, such being favorable to increase the softening temperature.

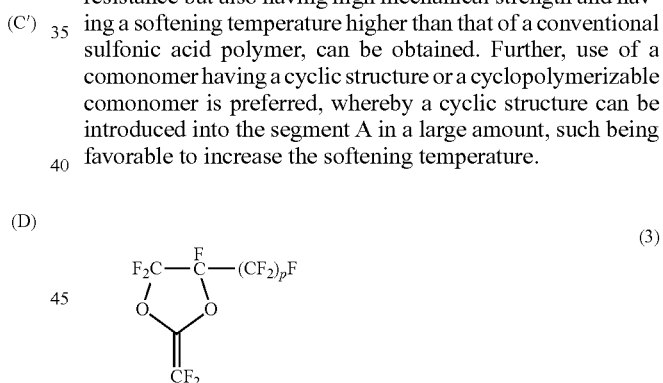

(3)

(4)

It is possible to use, as another comonomer, a perfluoro α-olefin such as hexafluoropropylene, a (perfluoroalkyl)ethylene such as (perfluorobutyl)ethylene, a (perfluoroalkyl) propylene such as 3-perfluorooctyl-1-propene, or a perfluorovinyl ether such as a perfluoro(alkyl vinyl ether) or a perfluoro(etheric oxygen atom-containing alkyl vinyl ether).

The comonomer such as a perfluorovinyl ether is preferably a compound represented by $CF_2=CF-(OCF_2CFZ)_t-O-R^f$, wherein t is an integer of from 0 to 3, Z is a fluorine atom or a trifluoromethyl group, and $R^f$ is a $C_{1-12}$ perfluoroalkyl group which may have a linear structure or a branched structure. Particularly, the following compounds (5), (6) and (7) are preferred. In the formulae, v is an integer of from 1 to 9, w is an integer of from 1 to 9, and x is 2 or 3.

$$CF_2=CFO(CF_2)_vCF_3 \quad (5)$$

$$CF_2=CFOCF_2CF(CF_3)O(CF_2)_wCF_3 \quad (6)$$

$$CF_2=CF(OCF_2CF(CF_3))_xO(CF_2)_2CF_3 \quad (7)$$

The polymerization reaction to produce the polymer constituting the segment A is not particularly limited so long as it is carried out under conditions where radicals are generated. For example, bulk polymerization, solution polymerization, suspension polymerization, emulsion polymerization or polymerization in liquid or supercritical carbon dioxide may be mentioned. For example, the polymer can be obtained by a polymerization method disclosed in WO03/037885.

As the fluoropolymer constituting the segment B, various polymers may be used. Specifically, PTFE, ETFE, PFA, FEP, polychlorotrifluoroethylene, an ethylene/chlorotrifluoroethylene copolymer, a polyvinylidene fluoride or a polyvinyl fluoride may, for example, be mentioned. They may be used alone or as a mixture of two or more of them. Particularly preferred is PTFE, PFA or FEP, which is a perfluoropolymer, in view of durability.

The electrolyte material of the present invention preferably has an ion exchange capacity (hereinafter referred to as $A_R$) of from 0.5 to 3.0 meq/g dry resin (hereinafter referred to as meq/g). If $A_R$ of the electrolyte material is less than 0.5 meq/g, the water content of the electrolyte material tends to be low, whereby the ionic conductivity tends to be low, and when the electrolyte material is used as an electrolyte membrane for a polymer electrolyte fuel cell, it tends to be difficult to obtain a sufficient cell output. On the other hand, when $A_R$ of the polymer electrolyte material exceeds 3.0 meq/g, the density of ion exchange groups in the polymer electrolyte material increases, and the strength of the polymer electrolyte material tends to be low. From the same viewpoint, $A_R$ of the electrolyte material is more preferably from 0.9 to 1.5 meq/g.

Further, the number average molecular weight of the polymer as the electrolyte material of the present invention is not particularly limited and can be properly set by changing the degree of polymerization of the copolymer depending upon the purpose of use. If the number average molecular weight is less than 5,000, physical properties such as degree of swelling will change with time, whereby the durability may be insufficient. Further, when the polymer is used as a non-crosslinked polymer electrolyte material, the number average molecular weight is preferably from 10,000 to 10,000,000, particularly preferably from 50,000 to 5,000,000, furthermore preferably from 100,000 to 3,000,000. If the molecular weight is too low, the strength as the membrane tends to be insufficient, and if the molecular weight is too high, formation of the membrane tends to be difficult.

Further, the polymer as the electrolyte material of the present invention preferably has a softening temperature of at least 90° C., more preferably at least 100° C. The softening temperature of the polymer here means a temperature at which the elastic modulus thereof starts to decrease abruptly in a test for evaluating the dynamic viscoelasticity of the polymer in which the temperature of the polymer is gradually raised from near room temperature while measuring the elastic modulus.

An operation temperature of a polymer electrolyte fuel cell is generally at most 80° C., but it is desired to be at least 90° C. and further at least 100° C. If the operation temperature of the fuel cell becomes at least 100° C., it will become feasible to utilize the exhaust heat of the cell more effectively, and at the same time, it will become easier to control the temperature of the cell during the operation because heat removal of the cell becomes easy. Furthermore in this case, it will become possible to reduce the catalyst poisoning due to carbon monoxide and others contained in an anode reaction gas, and as a result, it will become possible to improve the cell life and to increase the output power of the cell.

Accordingly, the softening temperature of the electrolyte material constituting an electrolyte membrane is at least 90° C., preferably at least 100° C., whereby the durability of the polymer electrolyte material is improved even when a cell is operated at high temperature, so that it becomes possible to suppress change with time of properties such as the degree of swelling and deformation of the electrolyte material during the operation of the cell. As a result, the life of a cell can be improved.

Further, by introducing a crosslinking structure into the polymer constituting the electrolyte material, excessive swelling will be suppressed by crosslinking, so as to prevent decrease of strength. Therefore, the polymer is able to endure operation at a higher temperature than before even though the softening temperature is not necessarily high. When the crosslinking structure is introduced into a polymer having a high softening temperature, the durability is further effectively enhanced. Since the crosslinked polymer can maintain its shape even at temperatures higher than the softening temperature, a membrane with high reliability can be obtained, particularly, in production of a polymer electrolyte membrane. In the case of the electrolyte material of the present invention, only one of the segments A and B may be crosslinked, or both may be crosslinked. With a view to suppressing swelling, it is particularly preferred to crosslink the segment A.

For example, in a case where the polymer constituting the segment A is crosslinked, the present alicyclic monomer is copolymerized with a fluoromonomer having at least two radical-polymerizable double bonds in its molecule in the presence of a radical initiator to obtain a crosslinked electrolyte material. Further, a polymer having a crosslinked structure may be obtained by copolymerizing the above-described comonomer in addition to the above monomers.

The fluoromonomer having at least two radical-polymerizable double bonds in its molecule is particularly preferably a perfluorinated monomer, and among such monomers, particularly preferred is a monomer represented by the following formula (8) ($Q^{F1}$ is a single bond, an oxygen atom or a $C_{1-10}$ perfluoroalkylene group which may have an etheric oxygen atom, or a perfluorodivinyl ether represented by $CF_2=CFOR^fOCF=CF_2$ ($R^f$ is a linear or branched perfluoroalkylene group which may have an etheric oxygen atom). Among monomers represented by the formula (8), particularly preferred are monomers represented by the formulae (9) to (14).

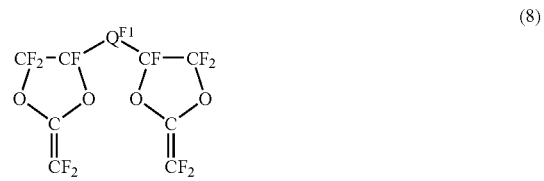

(8)

-continued

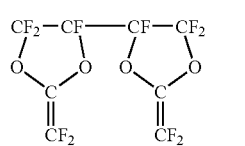

(9)

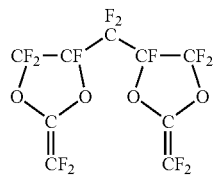

(10)

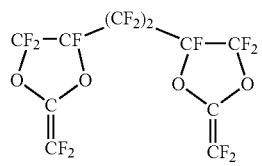

(11)

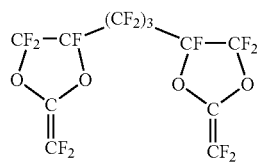

(12)

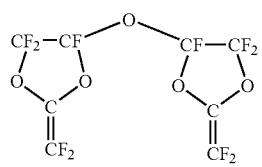

(13)

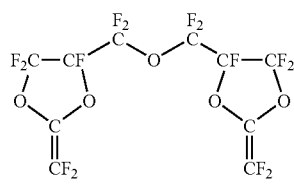

(14)

Further, specifically, the perfluorodivinyl ether represented by $CF_2=CFOR^{f3}OCF=CF_2$ may be monomers represented by the following formulae (15) to (17). In the formulae, each of h and k is an integer of from 2 to 8, and each of i and j which are independent of each other is an integer of from 0 to 5, provided that $i+j \geq 1$.

$CF_2=CFOCF=CF_2$ (15)

$CF_2=CFO(CF_2)_hOCF=CF_2$ (16)

$CF_2=CF[OCF_2CF(CF_3)]_iO(CF_2)_k[OCF(CF_3)CF_2]_jOCF=CF_2$ (17)

In a case where the electrolyte material of the present invention is made of a block copolymer, for example, at least one type of the above-mentioned perfluoromonomer containing an alicyclic structure is polymerized in the presence of a radical initiator and an iodine compound such as $F(CF_2)_4I$ or $I(CF_2)_4I$ to form the segment A, and then another perfluoromonomer is polymerized to form the segment B. The order of the polymerization steps may be inverted. The polymerization of each segment may be either homopolymerization or copolymerization. The polymerization of the monomer having a cyclic structure and an ion exchange group or a group capable of being converted to an ion exchange group used in the present invention, may be copolymerization with another comonomer having no such groups.

Further, in a case where the electrolyte material of the present invention is a graft copolymer and it is desired to obtain it in a membrane shape, such a method may be mentioned wherein a polymerizable functional group is imparted to the segment A obtained by polymerizing the above-described present alicyclic monomer to form a macromonomer, which is copolymerized with a monomer constituting the segment B to obtain a graft copolymer containing the segment B in the main chain and the segment A in side chains. The segments A and B may be inverted to produce a graft copolymer containing the segment A in the main chain and the segment B in side chains.

Further, such a method may also be mentioned that a membrane-shape substrate composed of a fluoropolymer constituting the segment B is irradiated with radioactive rays such as γ-rays or electron rays to generate radicals, and it is brought into contact with at least one type of the present alicyclic monomer to polymerize the present alicyclic monomer to form side chains thereby to obtain a graft copolymer. Such a method of utilizing radioactive rays is easily carried out and is preferred.

In the case of such a production method, the membrane-shape substrate containing the fluoropolymer constituting the segment B is preferably ETFE, PTFE, FEP, PFA or the like. By using the fluoropolymer as the main component, chemical durability will improve. Further, in a case where the main chain of the membrane substrate is cut to lower the molecular weight when the substrate is irradiated with radioactive rays, the membrane-shape substrate is preferably preliminarily crosslinked. Specifically, in the case of PTFE for example, it is known to be crosslinked by irradiation with radioactive rays while heated to 340° C.

The segment A in side chains is obtained by means of a step of polymerizing the present alicyclic monomer. The present alicyclic monomer is a perfluoromonomer, but with a monomer containing a C—H bond, which is not a perfluoromonomer, chemical durability of the electrolyte membrane will be insufficient. Further, in the present alicyclic monomer, at least one of carbon atoms constituting the double bond is a carbon atom contained in an alicyclic structure, and by the polymer having a cyclic structure, the softening temperature of the electrolyte is improved.

For grafting onto the membrane-shape substrate, the amount of radiation is preferably within a range of from 1 to 300 kGy. If it is smaller than 1 kGy, the amount of radicals generated in the substrate will be too small, and if it is larger than 300 kGy, chemical damage to the membrane-shape substrate may be significant. It is more preferably within a range of from 10 to 150 kGy. At the time of irradiation with radioactive rays, the substrate is preferably put in an inert gas atmosphere of e.g. nitrogen. For example, if an oxygen gas coexists, there is a possibility that the oxygen gas reacts with radicals generated in the substrate, which may impair chemical durability of the side chains. The radioactive rays may be any rays having an energy capable of generating radicals in the membrane-shape substrate and are not particularly limited, and they may, for example, be electron rays or γ rays.

In order that the membrane-shape substrate and the present alicyclic monomer are brought into contact with each other to polymerize the monomer, a proper temperature at which the present alicyclic monomer is polymerized should be selected. In the case of the above-described compound (D), the temperature is preferably within a range of from 10 to 100° C. If the temperature is less than 10° C., the polymerization rate tends to be too low, and if it exceeds 100° C., the proportion of the monomer homopolymerized outside the substrate may increase.

As the present alicyclic monomer, usually a monomer having a —SO$_2$F group is used to prepare a copolymer having —SO$_2$F groups, followed by hydrolysis in the presence of a base or further by conversion to an acid form, to produce an electrolyte material made of a polymer containing sulfonate groups or sulfonic acid groups.

Further, the polymer constituting the electrolyte material may be subjected to fluorination treatment with a fluorine gas after polymerization for the purpose of improving durability, or subjected to heat treatment in the presence of the air and/or water to stabilize unstable moieties such as the polymer terminals.

Such a production method is applicable not only to a case of forming the side chains by polymerizing the present alicyclic monomer but also to a case of forming the side chains of a graft copolymer by another perfluoromonomer which has an ion exchange group or a precursor group thereof and a polymerizable double bond.

In the above hydrolysis, and alkali metal hydroxide or an alkali metal carbonate is preferably used, whereby the —SO$_2$F groups are converted to sulfonate groups (—SO$_3$M$^b$ groups, wherein M$^b$ is a counter ion). M$^b$ is preferably an alkali metal ion or N$^+$R$^{11}$R$^{12}$R$^{13}$R$^{14}$ (wherein each of R$^{11}$ to R$^{14}$ which are independent of one another, is a hydrogen atom or a C$_{1-5}$ alkyl group). The alkali metal ion is preferably sodium ion, potassium ion or lithium ion. Further, N$^+$R$^{11}$R$^{12}$R$^{13}$R$^{14}$ is also preferably N$^+$(CH$_3$)$_4$, N$^+$(CH$_2$CH$_3$)$_4$, N$^+$(CH$_2$CH$_2$CH$_3$)$_4$ or N$^+$(CH$_2$CH$_2$CH$_2$CH$_3$)$_4$.

Further, by immersing the polymer containing sulfonate groups in an aqueous solution containing ions different from M$^b$ and capable of being counter ions, M$^b$ can be converted to the counter ions.

Further, the sulfonate groups (—SO$_3$M$^b$ groups) may be converted to sulfonic acid groups (—SO$_3$H groups) by conversion to an acid form with an acid such as hydrochloric acid, nitric acid or sulfuric acid. The conversion of such groups and the polymer treatment can be conducted in accordance with known method and conditions.

In a step of the hydrolysis or the conversion to an acid form after hydrolysis, water used is preferably ultrapure water containing less organic substances or metals or contaminants. Further, it is more preferred to immerse the electrolyte material in hydrogen peroxide solution during the above step to remove organic substances contained in the polymer. If impurities such as metals or organic substances are present in the electrolyte material, deterioration of the electrolyte membrane may be accelerated during operation of the fuel cell.

The electrolyte material of the present invention may be formed into a membrane and used as a polymer electrolyte membrane. The method of forming it into a membrane is not particularly limited. A cast film may be made from a liquid obtained by dissolving or dispersing the electrolyte material in a solvent, or a film may be obtained through an operation such as extrusion or drawing. For extrusion, in view of excellent melt flowability, it is preferred to use a polymer having —SO$_2$F groups which is a precursor of the electrolyte material and to convert it to a polymer electrolyte membrane by hydrolysis after molding.

Further, the electrolyte membrane may be reinforced with a porous material, fibers, woven fabric, non-woven fabric or the like of PTFE, FEP, PFA, polyethylene, polypropylene, polyimide or the like.

To further improve the durability of the electrolyte membrane made of the electrolyte material of the present invention, it is also preferred to incorporate a cerium compound or a manganese compound to the electrolyte membrane. Cerium or manganese is considered to have a function to decompose hydrogen peroxide as a substance which causes deterioration of the electrolyte membrane. Cerium or manganese is preferably present in the form of ions, particularly preferably ion-exchanged with a proton of a sulfonic acid group.

The electrolyte material of the present invention can be well dissolved or dispersed in an organic solvent having a hydroxyl group. The organic solvent having a hydroxyl group is not particularly limited and is preferably an organic solvent having an alcoholic hydroxyl group.

The organic solvent having an alcoholic hydroxyl group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol, or 3,3,4,4,5,5,6,6,7,7,8,8,8-tridecafluoro-1-octanol. In addition, an organic solvent having a carboxyl group such as acetic acid can also be used as an organic solvent other than the alcohols.

The above-mentioned solvents may be used alone or in combination as a mixture of two or more of them, as the organic solvent having a hydroxyl group. Furthermore, they may be used as mixed with water or with another fluorinated solvent or the like. In a case where the organic solvent having a hydroxyl group is used as a mixed solvent with water or with another fluorinated solvent, the content of the organic solvent having a hydroxyl group is preferably at least 10%, more preferably at least 20%, based on the total mass of the solvent.

In this case, the electrolyte material may be dissolved or dispersed in the mixed solvent from the beginning, or the mixture may be made in such a manner that the electrolyte material is first dissolved or dispersed in the organic solvent having a hydroxyl group and that water or another fluorinated solvent is then mixed thereinto. Furthermore, the dissolution or dispersion of the electrolyte material in the solvent is preferably carried out in a temperature range of from 0 to 250° C., more preferably in a range of from 20 to 150° C., under atmospheric pressure or under a condition of seal-off pressure by means of an autoclave or the like. In a case where an organic solvent having a boiling point lower than that of water is contained, water is added after or while distilling off the solvent, thereby substituting the solvent with water.

The liquid composition of the present invention obtained by using such a solvent is useful for production of a cast film made of the electrolyte material of the present invention or for production of the catalyst layer of a polymer electrolyte fuel cell. In a case of producing the catalyst layer, a catalyst is mixed into the liquid composition and the resultant liquid is applied. The content of the electrolyte material in the liquid composition used for such a purpose is preferably from 1 to 50%, more preferably from 3 to 30%, based on the total mass of the liquid composition. If the content of the electrolyte material is less than 1%, the number of coating steps will have to be increased to produce a film or a catalyst layer in a desired thickness, and it will take a long period of time for removing the solvent, to degrade the efficiency of the production operation. On the other hand, if the content of the electrolyte material exceeds 50%, the viscosity of the liquid composition tends to be too high, so as to degrade handlability.

Furthermore, the liquid composition may contain a resin of another electrolyte material, in addition to the electrolyte material of the present invention. In this case, the content of the electrolyte material of the present invention in the liquid composition is preferably at least 20%, more preferably at least 50%, based on the total mass of the entire electrolyte material in the liquid composition, with a view to securing sufficient gas diffusibility and water repellency of the catalyst layer obtained using the liquid composition as the raw material.

When the electrolyte material of the present invention is applied to a membrane or a catalyst layer as a material for the polymer electrolyte fuel cell, the ion exchange group is normally used in a state of a strong acid group, i.e., in a state in which the counter ion of the ion exchange group is $H^+$.

A membrane electrode assembly for a polymer electrolyte fuel cell can be prepared by disposing each of the catalyst layer for a cathode and the catalyst layer for an anode between a polymer electrolyte membrane and a gas diffusion layer. Where the catalyst layer is formed on the polymer electrolyte membrane, the gas diffusion layer separately prepared may be adjacently disposed or bonded on the catalyst layer, for example. Where the catalyst layer is formed on the gas diffusion layer, the polymer electrolyte membrane separately prepared may be disposed or preferably bonded between the catalyst layer of the cathode and the catalyst layer of the anode. Furthermore, where the catalyst layer is formed on a support plate (support film), it may be transferred, for example, to the polymer electrolyte membrane separately prepared, then the support plate is peeled off, and the gas diffusion layer separately prepared is adjacently disposed on the catalyst layer. The gas diffusion layer herein is made of a conductive porous material such as carbon paper and has a function of supplying a gas uniformly to the catalyst layer and a function as a current collector.

The bonding between the polymer electrolyte membrane and the catalyst layer, and the bonding between the catalyst layer and the gas diffusion layer may be implemented, for example, by hot press or by roll press.

The electrolyte material of the present invention is applicable not only to hydrogen/oxygen type and hydrogen/air type fuel cells, but also to direct methanol type fuel cells (DMFC). Methanol or an aqueous methanol solution to be used as fuel for DMFC may be supplied by a liquid feed or by a gas feed.

Furthermore, the electrolyte material of the present invention is not limited to use of electrolysis of sodium chloride and fuel cells, but can be used for various applications. For example, it can also be used for a proton permselective membrane to be used for electrolysis of water, production of hydrogen peroxide, production of ozone, recovery of waste acid, and so on; for a diaphragm of a redox flow cell; for a cation exchange membrane for electrodialysis to be used for desalination or salt production; and so on. Furthermore, it may also be used for a polymer electrolyte for a lithium primary cell, a lithium secondary cell, and a lithium ion secondary cell, a solid acid catalyst, a cation exchange resin, a sensor using a modified electrode, an ion exchange filter for removing a slight amount of ions in the air, an actuator, an electrochromic display element, and so on. Namely, it can be used as a material for variety of electrochemical processes. In addition, the electrolyte material of the present invention is also applicable to membranes for diffusion dialysis to be used for separation and purification of acids, bases and salts, charged porous membranes (a charged reverse osmosis membrane, a charged ultrafiltration membrane, a charged microfiltration membrane, etc.) for separation of protein, dehumidifying membranes, humidifying membranes, and so on.

The electrolyte material of the present invention has a low refractive index because it is made of a fluoropolymer. For this reason, when a thin film is formed by applying a liquid having the electrolyte material of the present invention having ion exchange groups and having a large ion exchange capacity dissolved or dispersed therein, followed by drying, it can also be used as an antireflection film which can be removed with water or with an aqueous alkali solution. In this case, water and/or an organic solvent can be used as a solvent for the liquid, and water is preferred. It can also be used as an antireflection film applied onto a resist in a production process of a semiconductor device and the like. Furthermore, it can also be used as an agent for imparting the hydrophilic property to a filter composed of a PTFE porous material.

EXAMPLES

Now, the present invention will be described in further detail with reference to Examples, but it should be understood that the present invention is by no means restricted to such Examples.

In the following Examples, the following abbreviations are used.

PSVE: $CF_2=CFOCF_2CF(CF_3)OCF_2CF_2SO_2F$,

TFE: $CF_2=CF_2$,

AIBN: $(CH_3)_2C(CN)N=N(CN)C(CH_3)_2$,

PFB: $CF_3CF_2CF_2COO-OOCCF_2CF_2CF_3$,

HCFC141b: $CH_3CCl_2F$,

HCFC225cb: $CClF_2CF_2CHClF$,

R-113: $CCl_2FCClF_2$.

(Preparation of Compound (D))

In accordance with a method disclosed in WO03/037885, compound (D) was prepared by means of preparation of compounds (A1) to (A5). Compound (A1) was prepared by a method disclosed in J. Fluorine Chem., 46, 39 (1990).

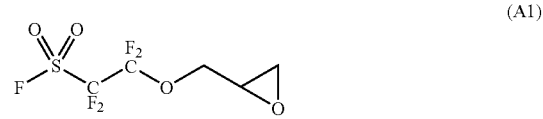

(A1)

(A2)

(A3)

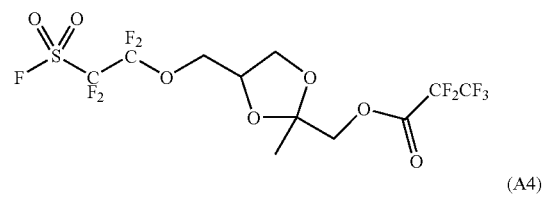

(A4)

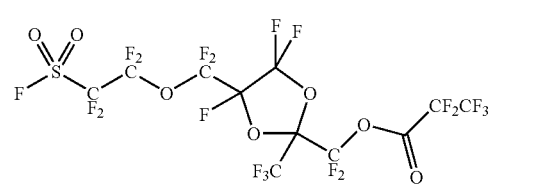

(A5)

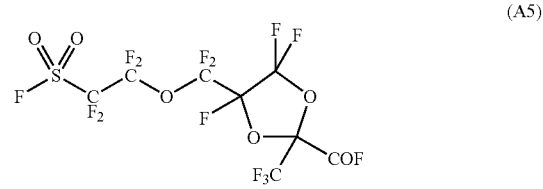

(Preparation and Evaluation of Graft Copolymer)

Example 1

A FEP form (tradename: Toyoflon 50F, manufactured by Toray Industries, Inc., thickness: 50 μm) substrate was irradiated with γ rays of 20 kGy in a nitrogen atmosphere and then the substrate was immersed in compound (D) and reacted at 60° C. for 117 hours. After the reaction, the substrate was withdrawn, washed with HCFC225cb and dried, and weighed. The degree of grafting was calculated by the following calculating formula and as a result, the degree of grafting was 43% and $A_R$ was 0.8.

Degree of grafting=(mass of the substrate after reaction−mass of the substrate before reaction)/mass of substrate before reaction Then, the obtained membrane-shape graft copolymer was immersed in a 18% (mass ratio) potassium hydroxide aqueous solution and heated at 80° C. for 16 hours to convert —$SO_2F$ groups to —$SO_3K$ groups. Then, the graft copolymer was washed with water and immersed in 2 mol/L hydrochloric acid to convert the —$SO_3K$ groups to sulfonic acid groups, and washed with ultrapure water (specific resistance of 18 MΩ·cm, total organic carbon content (TOC) of 10 ppb) and dried to obtain a membrane sample. Water used for the potassium hydroxide aqueous solution and 2 mol/L hydrochloric acid was also ultrapure water.

Example 2

A membrane sample having sulfonic acid groups made of a graft copolymer was obtained in the same manner as in Example 1 except that the amount of irradiation of γ rays was 50 kGy. The degree of grafting was 87%, and $A_R$ was 1.1.

Example 3

A membrane having —$SO_2F$ groups (degree of grafting of 85%, $A_R$ of 1.1 when hydrolyzed and converted to an acid form) obtained in the middle of the procedure in Example 2, was subjected to fluorination treatment by the following method and further hydrolyzed and converted to an acid form.

A multistage shelf made of a hastelloy C alloy was put in a pressure resistant reactor having an internal capacity of 32 L and having an internal surface made of a hastelloy C alloy, and 0.25 MPa by the gauge pressure of is a gas mixture of 20% of a fluorine gas and 80% of a nitrogen gas was introduced and maintained at 190° C. for 4 hours to make the metal surface be a non-conductor. After the temperature was lowered, the above membrane sample was put on the shelf in the 32 L pressure resistant reactor, and 0.25 MPa by the gauge pressure of a gas mixture of 20% of a fluorine gas and 80% of a nitrogen gas was introduced and maintained at 180° C. for 4 hours to carry out fluorination treatment. After the treatment, the reactor was evacuated of the fluorine gas and the membrane sample was taken out, and the —$SO_2F$ groups were converted to sulfonic acid groups in the same manner as in Example 1 to obtain a membrane sample having sulfonic acid groups.

Example 4

A membrane sample having sulfonic acid groups was prepared in the same manner as in Example 1 except that the amount of irradiation of γ rays was 120 kGy and the time period of the reaction of the compound (D) with the substrate was 49 hours. The degree of grafting was 89%, and the ion exchange capacity $A_R$ was 1.1.

Example 5

A membrane sample having sulfonic acid groups is prepared in the same manner as in Example 1 except that the substrate is an ETFE film (tradename: Aflon COP, manufactured by Asahi Glass Company, Limited, thickness: 50 μm). The degree of grafting is 73%, and the ion exchange capacity $A_R$ is 1.0.

Example 6

Comparative Example

Compound (D) and TFE were subjected to copolymerization, molding, hydrolysis and conversion to an acid form as follows to obtain a sample made of a polymer in which —$SO_2F$ groups of a random copolymer of a compound (D) and TFE converted to sulfonic acid groups.

8.48 g of compound (D), 76.3 g of HCFC225cb containing 17 mg of ethanol and 170 mg of perfluorobenzoyl peroxide were put in a stainless autoclave having a capacity of 0.1 L and cooled with liquid nitrogen, followed by deaeration. 11.3 g of TFE was introduced, and reaction was carried out at 70° C. for 50 minutes. During the reaction, the gauge pressure decreased from 0.97 MPa to 0.43 MPa. After cooling, the gas in the system was purged, and the reaction mixture was poured into hexane to precipitate a polymer. The polymer was washed with hexane and vacuum dried at 100° C. to obtain 14.1 g of a white polymer.

The ion exchange capacity $A_R$ of the polymer was 1.12 meq/g as obtained from the sulfur content determined by elemental analysis.

The polymer was pressurized at 300° C. to prepare a film with a thickness of about 50 μm, and —$SO_2F$ groups were converted to sulfonic acid groups in the same manner as in Example 1, and the film was dried to obtain a membrane sample.

Example 7

Comparative Example 100 g of PSVE and 70 mg of AIBN were put in an autoclave having an internal capacity of 200 ml, followed by deaeration, and the autoclave was filled with TFE until the pressure became 1.1 MPa, followed by heating at 70° C. and stirring to initiate the polymerization. During the polymerization, TFE was kept being fed to maintain a pressure of 1.1 MPa. 10 Hours later, the polymerization was terminated by cooling and purging, the reaction mixture was diluted with HCFC225cb, and HFC141b was put to precipitate a polymer, which was washed with HCFC141b once. After filtration, vacuum drying was conducted at 80° C. for 16 hours to obtain 29.5 g of a white polymer (TFE-PSVE copolymer). The sulfur content was determined by elemental analysis to determine the ion exchange capacity and as a result, it was 1.1 meq/g.

The polymer was pressurized at 300° C. to prepare a film with a thickness of about 50 μm, and —$SO_2F$ groups in the film were converted to sulfonic acid groups in the same manner as in Example 1, and the film was dried to obtain a membrane sample.

Example 8

Comparative Example

An ETFE film (tradename: Aflon COP, manufactured by Asahi Glass Company, Limited, thickness: 50 µm) substrate was irradiated with 20 kGy of γ rays in a nitrogen atmosphere, and then immersed in styrene and reacted at 60° C. for 40 hours. After the reaction, the substrate was withdrawn, washed with toluene, dried and weighed. The degree of grafting was 35%.

Then, the substrate was immersed in a liquid mixture of 1,1,2,2-tetrachloroethane/chlorosulfonic acid in a mass ratio of 70/30, and reacted at room temperature for 30 minutes. Then, it was washed with 1,1,2,2-tetrachloroethane and dried, and chlorosulfonyl groups were converted to sulfonic acid groups in the same manner as in Example 1, and the substrate was dried to obtain a membrane sample.

Example 9

Comparative Example

Commercially available Nafion 112 was used as a membrane sample.
(Measurement of Membrane Resistance)

The AC resistivity of the membrane sample in each Example was measured by a four-probe method in an atmosphere of 80° C.-90% RH. The results are shown in Table 1.
(Evaluation of Chemical Durability in Fenton's Reagent)

The membrane sample was immersed by Fenton's reagent containing 3% of hydrogen peroxide and 200 ppm of $Fe^{2+}$ (ferric sulfate was used) and evaluated by the weight loss of the membrane sample after 16 hours at 60° C. The results are shown in Table 1.
(Evaluation of Softening Temperature by Dynamic Viscoelasticity)

Using a dynamic viscoelasticity analyzer DVA200, manufactured by ITK Co., Ltd., the measurement of the dynamic viscoelasticity was carried out with a membrane sample width of 0.5 cm and a length of specimen between grips being 2 cm at a measuring frequency of 10 Hz and a temperature raising rate of 3° C./min (Examples 1, 6, 7 and 9). The temperature at which the storage modulus became $1.0 \times 10^8$ Pa was taken as the softening temperature, and the results are shown in Table 1.
(Process for Preparation of Membrane-catalyst Layer Assembly)

The polymer obtained in Example 7 (one having —$SO_2F$ groups in the TFE-PSVE copolymer converted to sulfonic acid groups) was dispersed in ethanol by means of a pressure resistant autoclave having an internal surface made of a hastelloy C alloy, to obtain a 10% ethanol solution. This solution will be referred to as electrolyte liquid A. 126 g of water was added to 20 g of a catalyst having 50% of platinum supported on a carbon black powder, followed by application of ultrasonic waves for 10 minutes to have the catalyst uniformly dispersed. 80 g of electrolyte liquid A was added thereto, and 54 g of ethanol was further added to bring the solid content concentration to be 10%. This dispersion will be referred to as coating fluid for preparation of a cathode catalyst layer. This coating fluid was applied onto a PTFE substrate film and dried to prepare a cathode catalyst layer having a platinum amount of 0.5 mg/cm².

Further, 124 mg of water was added to 20 g of a catalyst having 53% of an alloy of platinum and ruthenium (platinum/ruthenium ratio=30/23) supported on a carbon black powder, followed by application of ultrasonic waves for 10 minutes to have the catalyst uniformly dispersed, and 75 g of the above electrolyte liquid A was added thereto, and 56 g of ethanol was further added thereto to bring the solid content concentration to be about 10%. This dispersion will be referred to as a coating fluid for preparation of an anode catalyst layer. This coating fluid was applied onto an ETFE substrate film and dried to prepare an anode catalyst layer having a platinum amount of 0.35 mg/cm². Water used for both the coating fluid for preparation of a cathode catalyst layer and the coating fluid for preparation of an anode catalyst layer had a resistivity of 18 MΩ·cm and a TOC of 10 ppb.

The membrane sample was sandwiched between the cathode catalyst layer and the anode catalyst layer, followed by hot pressing (pressing conditions: 120° C., two minutes, 3 MPa) to have the two catalyst layers bonded to the membrane, and the substrate films were peeled off to obtain a membrane-catalyst layer assembly having an electrode area of 25 cm².
(Evaluation of Durability of Membrane-electrode Assembly)

The above membrane-catalyst layer assembly was sandwiched between two gas diffusion layers made of carbon paper to obtain a membrane-electrode assembly. The carbon paper used here had a layer comprising carbon and polytetrafluoroethylene on the surface on one side, and it was disposed so that such a layer was in contact with the catalyst layer of the membrane-catalyst layer assembly. This membrane-electrode assembly was assembled into a cell for power generation, and hydrogen at 133 ml/min and air at 445 ml/min were supplied under normal pressure to the anode and to the cathode respectively, as humidified gases with a dew-point of 80° C. into the cell. Power generation was continuously carried out at a cell temperature of 80° C. and a current density of 0.5 A/cm², whereby the voltage was recorded.

Durability of the membrane sample was evaluated from the initial cell voltage and the cell voltage after 100 hours. The results are shown in Table 2.

TABLE 1

| | $A_R$ (meq/g) | Resistivity (Ω · cm) | Weight loss by Fenton's reagent (%) | Softening point (° C.) |
|---|---|---|---|---|
| Ex. 1 | 0.8 | 8 | 0 | 188 |
| Ex. 2 | 1.1 | 6 | 0 | — |
| Ex. 3 | 1.1 | 6 | 0 | — |
| Ex. 4 | 1.1 | 6 | 0 | — |
| Ex. 5 | 1.0 | 7 | 0 | — |
| Ex. 6 | 1.1 | 5 | 0 | 107 |
| Ex. 7 | 1.1 | 5 | 0 | 81 |
| Ex. 8 | 1.8 | 6 | −38 | — |
| Ex. 9 | 0.9 | 6 | 0 | 85 |

TABLE 2

| | Initial cell voltage (mV) | Cell voltage after 100 hours (mV) |
|---|---|---|
| Ex. 3 | 640 | 645 |
| Ex. 7 | 650 | 645 |
| Ex. 8 | 630 | 280 |

INDUSTRIAL APPLICABILITY

The polymer electrolyte of the present invention has a high softening temperature as compared with conventional one and is excellent in durability, whereby operation of a fuel cell at high temperature as compared with conventional one becomes possible. Further, the production cost can be lowered, because it is produced by a simple production process.

The entire disclosure of Japanese Patent Application No. 2004-311833 filed on Oct. 27, 2004 including specification, claims and summary is incorporated herein by reference in its entirety.

What is claimed is:

1. An electrolyte material made of a polymer containing a segment A of a polymer containing repeating units based on a perfluoromonomer having an ion exchange group and having a polymerizable double bond, at least one of carbon atoms in the polymerizable double bond being a carbon atom contained in an alicyclic structure, and a segment B of a fluoropolymer containing substantially no ion exchange group,
wherein the polymer is a graft copolymer containing side chains comprising the segment A and a main chain comprising the segment B.

2. The electrolyte material according to claim 1, wherein the ion exchange group contained in the segment A is represented by $-(SO_2X(SO_2R^f)_a)^-M^+$ (wherein $M^+$ is $H^+$, a monovalent metal cation or an ammonium ion containing or not containing a hydrocarbon substituent, $R^f$ is a linear or branched perfluoroalkyl group which may contain an etheric oxygen atom, "a" is an integer of from 0 to 2, and X is an oxygen atom, a nitrogen atom or a carbon atom, provided that $a=0$ when X is an oxygen atom, $a=1$ when X is a nitrogen atom, and $a=2$ when X is a carbon atom.

3. The electrolyte material according to claim 1, wherein the repeating units based on the perfluoromonomer are represented by the following formula (1):

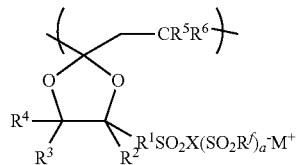

(1)

wherein $R^1$ is a bivalent perfluoroorganic group which may contain an etheric oxygen atom, and each of $R^2$ to $R^6$ which are independent of one another, is a fluorine atom or a monovalent perfluoroorganic group which may contain an etheric oxygen atom.

4. The electrolyte material according to claim 3, wherein both $R^5$ and $R^6$ in the formula (1) are fluorine atoms.

5. The electrolyte material according to claim 4, wherein the repeating units based on the perfluoromonomer are represented by the following formula (2):

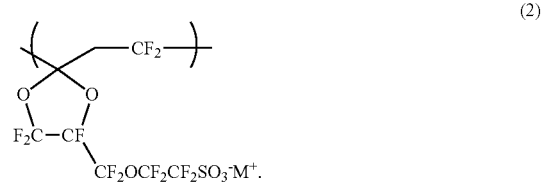

(2)

6. The electrolyte material according to claim 1, wherein the fluoropolymer constituting the segment B is at least one member selected from the group consisting of a polytetrafluoroethylene, an ethylene/tetrafluoroethylene copolymer, a tetrafluoroethylene/perfluoro(alkyl vinyl ether) copolymer, a tetrafluoroethylene/hexafluoropropylene copolymer, a polychlorotrifluoroethylene, an ethylene/chlorotrifluoroethylene copolymer, a polyvinylidene fluoride and a polyvinyl fluoride.

7. The electrolyte material according to claim 1, which has an ion exchange capacity of from 0.5 to 3.0 meq/g dry resin.

8. The electrolyte material according to claim 3, wherein the fluoropolymer constituting the segment B is at least one member selected from the group consisting of a polytetrafluoroethylene, an ethylene/tetrafluoroethylene copolymer, a tetrafluoroethylene/perfluoro(alkyl vinyl ether) copolymer, a tetrafluoroethylene/hexafluoropropylene copolymer, a polychlorotrifluoroethylene, an ethylene/chlorotrifluoroethylene copolymer, a polyvinylidene fluoride and a polyvinyl fluoride.

* * * * *